United States Patent
Azagarsamy et al.

(10) Patent No.: US 11,075,407 B2
(45) Date of Patent: Jul. 27, 2021

(54) GRAFTED POLYESTERS AS ELECTROLYTES FOR LITHIUM ION BATTERIES

(71) Applicant: Robert Bosch GmbH, Stuttgart (DE)

(72) Inventors: Malar Azagarsamy, Fremont, CA (US); Hany Basam Eitouni, Oakland, CA (US)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 16/355,658

(22) Filed: Mar. 15, 2019

(65) Prior Publication Data
US 2020/0295401 A1  Sep. 17, 2020

(51) Int. Cl.
*H01M 10/0565* (2010.01)
*C08G 61/08* (2006.01)
*C08G 63/08* (2006.01)
*C08G 63/91* (2006.01)
*H01M 10/0525* (2010.01)
*H01M 10/0562* (2010.01)
*H01M 10/0585* (2010.01)
*H01M 4/02* (2006.01)

(52) U.S. Cl.
CPC ........ *H01M 10/0565* (2013.01); *C08G 61/08* (2013.01); *C08G 63/08* (2013.01); *C08G 63/912* (2013.01); *H01M 10/0525* (2013.01); *H01M 10/0562* (2013.01); *H01M 10/0585* (2013.01); *H01M 2004/028* (2013.01); *H01M 2300/0082* (2013.01)

(58) Field of Classification Search
CPC ... H01M 10/0565; C08G 61/08; C08G 63/08; C08G 63/912
See application file for complete search history.

(56) References Cited

U.S. PATENT DOCUMENTS

| | | | | |
|---|---|---|---|---|
| 2003/0077984 A1* | 4/2003 | Smith | ..................... | B24C 1/086 451/38 |
| 2018/0248156 A1* | 8/2018 | Nakamura | .............. | B32B 27/06 |
| 2019/0144590 A1* | 5/2019 | Epps, III | ................. | C07C 41/18 429/308 |

FOREIGN PATENT DOCUMENTS

| | | |
|---|---|---|
| CN | 109103499 A | 12/2018 |
| EP | 1620884 B1 | 5/2008 |

OTHER PUBLICATIONS

Etacheri, "Challenges in the development of advanced Li-ion batteries: a review," DOI: 10.1039/c1ee01598b, Published on Jul. 26, 2011 on http://pubs.rsc.org | doi:10.1039/C1EE01598B.

Kolb, "Monomers and their polymers derived from saturated fatty acid methyl esters and dimethyl carbonate," Green Chem., 2012, 14, 2429.

(Continued)

*Primary Examiner* — Matthew J Merkling
(74) *Attorney, Agent, or Firm* — Brooks Kushman. P.C.

(57) ABSTRACT

New polymers with that have polyesters grafted onto polynorbornene backbones have been synthesized. When these grafted polymers are combined with electrolyte salts, such polymer electrolytes have shown excellent electrochemical oxidation stability in lithium battery cells. Their stability along with their excellent ionic transport properties make these grafted polyesters especially suitable as electrolytes in high energy density lithium battery cells.

19 Claims, 4 Drawing Sheets

(56) References Cited

OTHER PUBLICATIONS

Lou et al., "Living Cationic Polymerization of Delta-Valerolactone and Syntehsis of High Molecular Weight Homopolymer and Asymmetric Telechelic and Block Copolymer", Macromolecules, American Chemical Society, United States, DOI:10.1021/MA0113677, Jan. 1, 2002, pp. 1190-1195.

Mecerreyes et al., "Ring-opening Metathesis Polymerization of New a-Norbornenyl Poly(E-caprolactone) Macromonomers", Journal of Polymer Science, Part A: Polymer Chemistry, Jul. 15, 1999, pp. 2447-2455.

\* cited by examiner

GRAFTED POLYESTERS AS ELECTROLYTES FOR LITHIUM ION BATTERIES

BACKGROUND OF THE INVENTION

Field of the Invention

This invention relates generally to electrolytes for lithium batteries, and, more specifically, to electrolytes that are especially suited for use in cathodes and at high voltages.

More and more lithium battery manufacturers are using next-generation cathode materials such as NCA (lithium nickel cobalt aluminum oxide), NCM (lithium nickel cobalt manganese oxide), and high energy NCM (HE-NCM-magnesium-rich lithium nickel cobalt manganese oxide) in order to exploit their potentially high gravimetric energy densities (as high as 300-500 Wh/kg), their good rate capabilities, and their long-term stability. Cells made with such oxidic cathode materials often operate at higher voltages (e.g., as high as 4.7V) than do cells (e.g., 3.6-3.8V) with olivine cathode materials such as LFP (lithium iron phosphate). Electrolytes that have been stable at the lower voltages of LFP cells may have difficulty operating at the higher voltages, especially in the cathode. Degradation, in the form of oxidation, may lead to capacity fade early in the life of a cell.

Thus, there is a need to develop electrolytes that are especially well-suited to operate in the high voltage conditions of next generation cathode materials.

SUMMARY

In one embodiment of the invention, a grafted polymer is disclosed. The grafted polymer has the following structure:

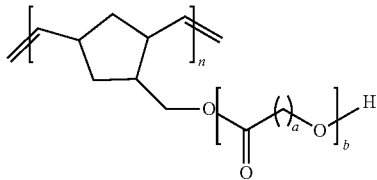

in which a, b, and n are all integers; a ranges from 1-10; b ranges from 1 to 1000; and n ranges from 2 to 1000. In some embodiments of the invention, an electrolyte salt, such as a lithium salt, is added to the grafted polymer, and the grafted polymer is an electrolyte. In some arrangements, the electrolyte also contains ceramic electrolyte particles. In some arrangements, the grafted polymer is crosslinked. The crosslinked grafted polymer may be combined with an electrolyte salt, such as a lithium salt, and the polymer is an electrolyte.

In some embodiments of the invention, a positive electrode suitable for use in an electrochemical cell is disclosed. The positive electrode contains mixture of positive electrode active material particles and a catholyte. The catholyte may be any of the grafted polymer electrolytes disclosed herein. The catholyte may be a solid polymer electrolyte. The catholyte may also contain ceramic electrolyte particles. The catholyte may be crosslinked. The positive electrode active material (particles) may be any of lithium iron phosphate, lithium metal phosphate, divanadium pentoxide, lithium nickel cobalt aluminum oxide, lithium nickel cobalt manganese oxide, magnesium-rich lithium nickel cobalt manganese oxide, lithium manganese spinel, lithium nickel manganese spinel, and/or combinations thereof. The positive electrode may or may not also contain an electronically-conductive additive.

In some embodiments of the invention, an electrochemical cell is disclosed. The cell contains an anode configured to absorb and release lithium ions; a cathode comprising cathode active material particles, an optional electronically-conductive additive, and a first catholyte, and a current collector adjacent to an outside surface of the cathode; and a separator region between the anode and the cathode, the separator region comprising a separator electrolyte configured to facilitate movement of lithium ions back and forth between the anode and the cathode. The first catholyte may be any of the grafted polymer electrolytes disclosed herein, and the electrolyte salt may be a lithium salt. The first catholyte may be a solid polymer electrolyte. The first catholyte further may also contain ceramic electrolyte particles. The first catholyte may be crosslinked.

In some arrangements, the first catholyte and the separator electrolyte are the same. In some arrangements, the separator electrolyte is a solid polymer electrolyte.

In some embodiments of the invention, there is also an overcoat layer between the cathode and the separator region, and the overcoat layer contains a second catholyte. The second catholyte may be any of the grafted polymer electrolytes disclosed herein. In some arrangements, the first catholyte and the second catholyte are the same. The anode may contain any of lithium metal, lithium alloy, lithium titanate, graphite, and/or silicon.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
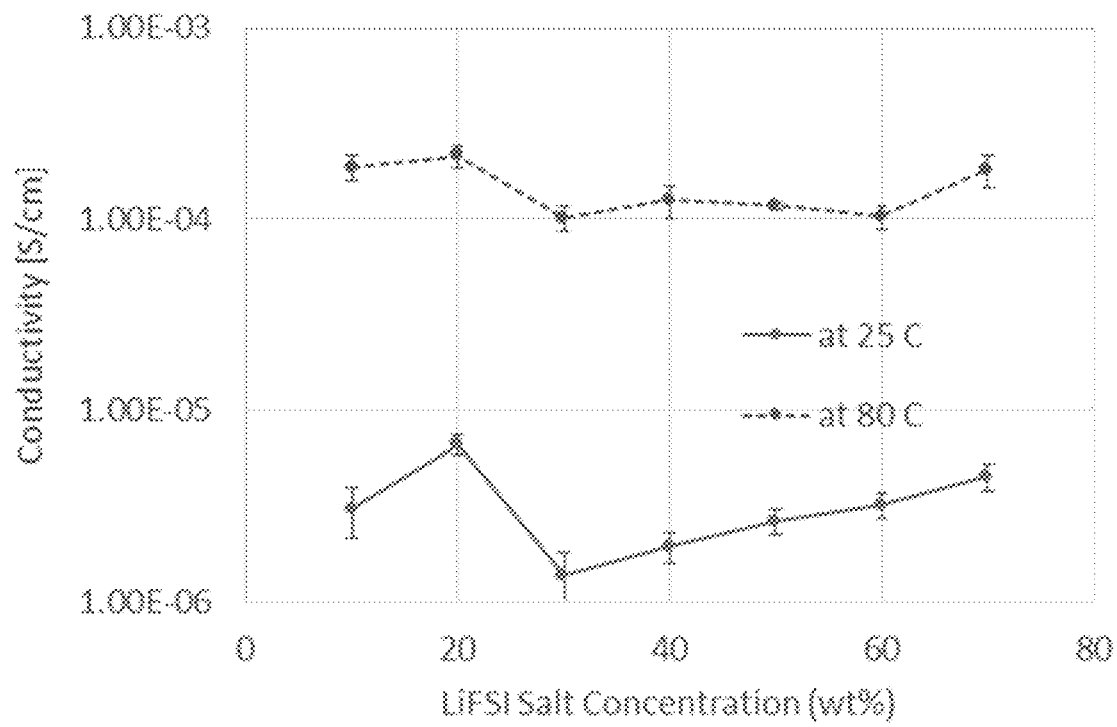
FIG. 1 is a graph that shows ionic conductivities of poly(norbornene)-graft-poly(caprolactone) with LiFSI at 25° C. and 80° C., according to some embodiments of the invention.

The embodiments of the invention are illustrated in the context of grafted poly(caprolactone) and grafted poly(valerolactone) polymers that can be used as electrolytes or electrolyte additives in lithium battery cells and the like. The skilled artisan will readily appreciate, however, that the materials and methods disclosed herein will have application in a number of other contexts where high-voltage electrolytes are desirable, particularly where long-term stability is important.

These and other objects and advantages of the present invention will become more fully apparent from the following description taken in conjunction with the accompanying drawings.

All publications referred to herein are incorporated by reference in their entirety for all purposes as if fully set forth herein.

In this disclosure, the terms "negative electrode" and "anode" are both used to describe a negative electrode. Likewise, the terms "positive electrode" and "cathode" are both used to describe a positive electrode.

It is to be understood that the terms "lithium metal" or "lithium foil," as used herein with respect to negative electrodes, describe both pure lithium metal and lithium-rich metal alloys as are known in the art. Examples of lithium rich metal alloys suitable for use as anodes include Li—Al, Li—Si, Li—Sn, Li—Hg, Li—Zn, Li—Pb, Li—C or any other Li-metal alloy suitable for use in lithium metal batteries. Other negative electrode materials that can be used in the embodiments of the invention include materials in which lithium can intercalate, such as graphite, and other materials that can absorb and release lithium ions, such as silicon, germanium, tin, and alloys thereof. Many embodiments described herein are directed to batteries with solid polymer electrolytes, which serve the functions of both electrolyte and separator. As it is well known in the art, batteries with liquid electrolytes use an inactive separator material that is distinct from the liquid electrolyte.

The following construction is used throughout this disclosure: "each variable is chosen independently" from a list that is provided. An example of this usage can be found with reference to X groups in some of the inventive polymer structures in which there are many Xs. The example is, "each X may be chosen independently from hydrogen, fluorine, methyl, ethyl, isopropyl, and trifluoromethyl groups." This construction is used to mean that for a particular X in the structure, any of the groups in the list may be used. In choosing a group to use for another X in the structure, any of the groups in the list may be used with no regard to the choices that have been made for other X groups. Thus, the following arrangements are all possible: all the Xs may be the same, all the Xs may be different, or some Xs may be the same and some may be different.

The molecular weights given herein are number-averaged molecular weights.

The term "solid polymer electrolyte" is used herein to mean a polymer electrolyte that is solid at battery cell operating temperatures. Examples of useful battery cell operating temperatures include room temperature (25° C.), 40° C., and 80° C.

In this disclosure, ranges of values are given for many variables. It should be understood that the possible values for any variable also include any range subsumed within the given range.

Polymer electrolytes are of great interest for lithium ion battery cells due to their high mechanical, flexibility, and safety features as compared to their small molecule counter parts. However, many polymeric systems used as electrolytes for lithium ion battery applications are linear polymers that crystallize at room temperature and thus may not be useful as electrolytes at room temperature. The polymers disclosed herein have high-voltage-stable (>4.2V) polyester moieties, i.e., poly(caprolactone) and poly(valerolactone), as pendant groups grafted onto a norbornene backbone. Such grafted polymer systems have reduced melting points compared to their linear counterparts and thus improved lithium ion transport properties at room temperature compared to higher melting point linear polymers.

Polyesters Grafted onto Poly(norbornene)

The general structure for polyesters grafted onto a poly(norbornene) backbone is shown below.

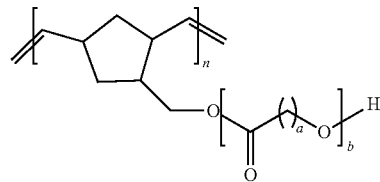

Variables a, b, and n are all integers; a ranges from 1 to 10; b ranges from 1 to 1000 and n ranges from 2 to 1000. Such polymers can be mixed with electrolyte salts, such as lithium salts, to form electrolytes suitable for use as catholytes and/or separator electrolytes in battery cells, such as lithium battery cells.

In another embodiment of the invention, particles of ceramic electrolyte are mixed into an electrolyte based on polyesters grafted onto poly(norbornene) to form an enhanced composite electrolyte with superior ionic transport and mechanical properties. Such a composite electrolyte may be used in a lithium battery cell in the separator region or in the cathode. Examples of ceramic electrolytes that are useful for mixing with such electrolytes include, but are not limited to, those shown in Table 1 below.

TABLE 1

Exemplary Ceramic Conductors for Use as Polymer Electrolyte Additives

| Electrolyte Type | Exemplary Formulas | Mixture Proportion |
|---|---|---|
| Oxynitride glass | $Li_xPO_yN_z$ x = 2.9, y = 3.3, z = 0.46  0.24 < z < 1.2 $Li_xBO_yN_z$ | |
| Sulfide and oxysulfide glass | $Li_2S \bullet P_2S_5$ | 0.75:0.25 |
| | $Li_2S \bullet SiS_2$ | 0.6:0.4 |
| | $Li_2S \bullet SiS_2 \bullet Li_xMO_4$ M = Si, P, Ge | 0.57:0.38:0.05 |
| | $Li_2S \bullet SiS_2 \bullet Li_3PO_4$ | 0.63:0.36:0.01 |
| | $Li_2S \bullet SiS_2 \bullet xMS_y$, M = Sn, Ta, Ti | 0.6:0.4:0.01-0.05 |
| | $Li_2S \bullet SiS_2 \bullet Li_3N$ | 0.55:0.40:0.03 |
| Li thionitride glass | $Li_3N \bullet SiS_2$ | 0.4:0.6 |
| LLTO Perovskite structure (Ohara type) | $La_{2/3-x}Li_{3x}TiO_3$ $0.03 \leq x \leq 0.167$ $La_{1/3-x}Li_{3x}TaO_3$ $0.025 \leq x \leq 0.167$ $La_{1/3-x}Li_{3x}NbO_3$ $0 \leq x \leq 0.06$ | |
| Nasicon-type (Lisicon) phosphate | $Li_{1.3}Ti_{1.7}Al_{0.3}(PO_4)_3$ $LiAlTa(PO_4)_3$ $LiAl_{0.4}Ge_{1.6}(PO_4)_3$ $Li_{1.4}Ti_{1.6}Y_{0.4}(PO_4)_3$ $Li_{3-2x}(Sc_{1-x}M_x)_2(PO_4)_3$ M = Zr, Ti, x = 0.1, 0.2 $Li_3Sc_{1.5}Fe_{0.5}(PO_4)_3$ | |

*denotes that components are mixed together

Conductivities of Electrolytes Based on Poly(caprolactone) Grafted onto Poly(norbornene)

The ionic conductivity of polymers of poly(caprolactone) grafted onto poly(norbornene) was tested by mixing them with various concentrations (i.e., between 10 and 70 wt %), of LiFSI (lithium bis(fluorosulfonyl)imide) to form electrolytes. Symmetric cells with two electrodes were built by sandwiching these electrolytes between two aluminum electrodes. Impedance spectroscopy was then used to measure ionic conductivities of these electrolytes at 25° C. and at 80° C. The results are shown in FIG. 1. The poly(norbornene)- graft-poly(caprolactone) was tested and showed a peak in conductivity at 20 wt % LiFSI.

Cell Designs that Include Polyesters Grafted onto Poly (norbornene)

Figure 2:
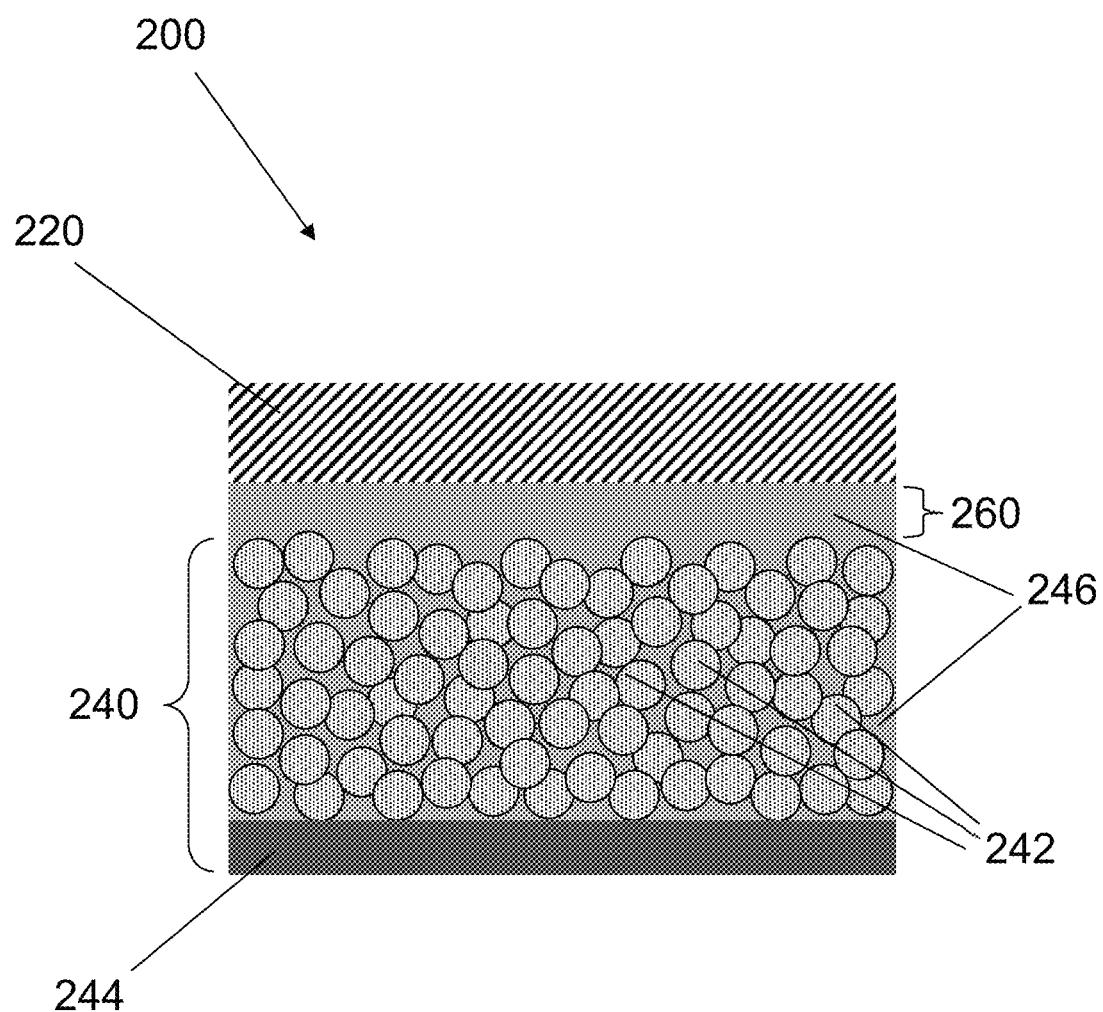
FIG. 2 is a schematic illustration of one configuration of a lithium battery cell that contains an electrolyte that is used in both the cathode and the separator, according to an embodiment of the invention.

In one embodiment of the invention, a lithium battery cell 200 has an anode 220 that is configured to absorb and release lithium ions, as shown in FIG. 2. The anode 220 may be a lithium or lithium alloy foil or it may be made of a material into which lithium ions can be absorbed such as graphite or silicon. Other choices for the anode 220 include, but are not limited to, lithium titanate, and lithium-silicon alloys. The lithium battery cell 200 also has a cathode 240 that includes cathode active material particles 242, an electronically-conductive additive such as carbon black (not shown), a current collector 244, a catholyte (electrolyte in the cathode) 246, and an optional binder (not shown). In one arrangement, the catholyte 246 includes any of the grafted polymer electrolytes disclosed herein. In another arrangement, the catholyte 246 includes mixtures or combinations of other solid polymer electrolytes with the grafted polymer electrolytes disclosed herein. There is a separator region 260 between the anode 220 and the cathode 240. The catholyte 246 extends all the way into the separator region 260 and facilitates movement of lithium ions back and forth between the anode 220 and the cathode 240 as the cell 200 cycles. The electrolyte 246 in the separator region 260 and the catholyte 246 in the cathode 240 are the same.

Figure 3:
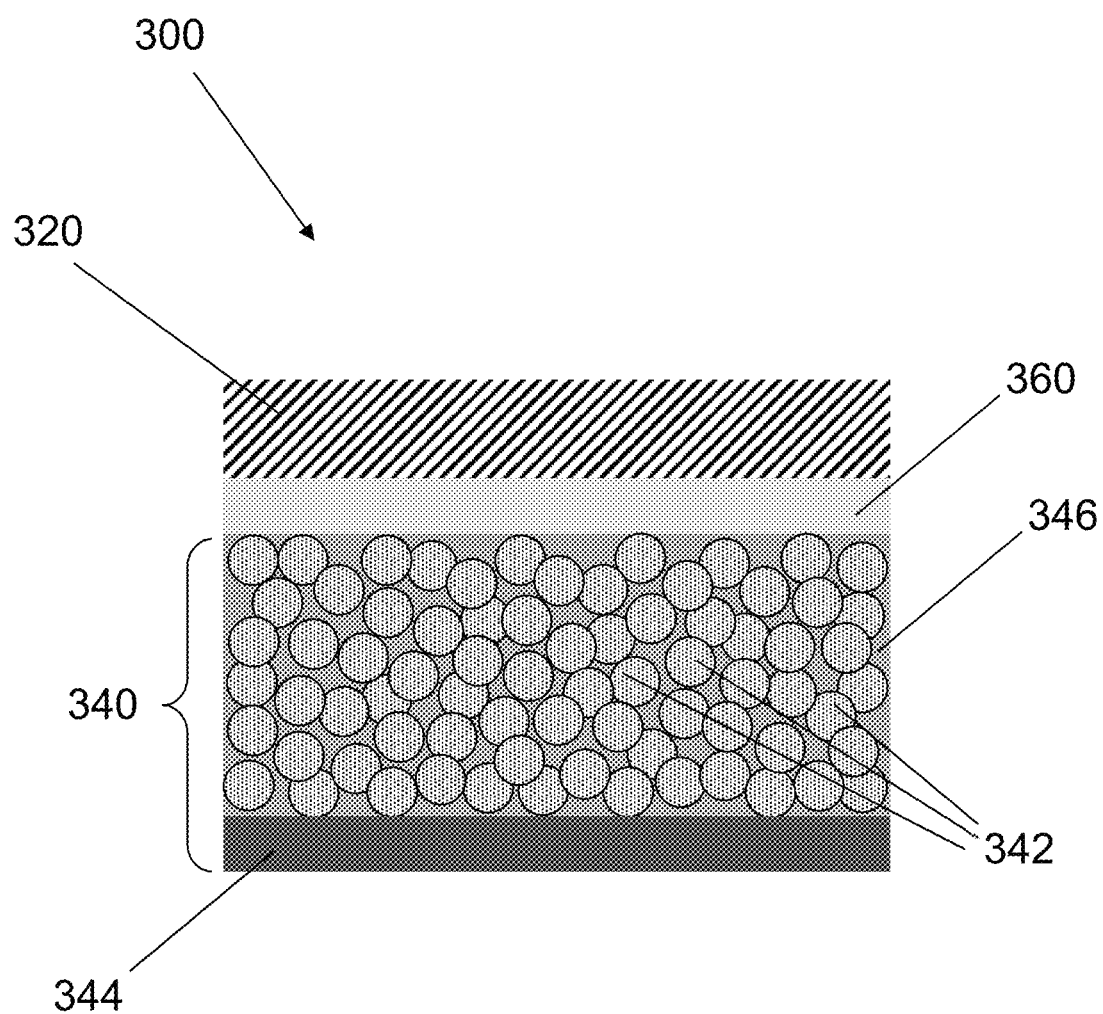
FIG. 3 is a schematic illustration of another configuration of a lithium battery cell that contains a catholyte and a separator electrolyte different from the catholyte, according to an embodiment of the invention.

In another embodiment of the invention, a lithium battery cell 300 has an anode 320 that is configured to absorb and release lithium ions as shown in FIG. 3. The anode 320 may be a lithium or lithium alloy foil or it may be made of a material into which lithium ions can be absorbed such as graphite or silicon. Other choices for the anode 320 include, but are not limited to, lithium titanate, and lithium-silicon alloys. The lithium battery cell 300 also has a cathode 340 that includes cathode active material particles 342, an electronically-conductive additive such as carbon black (not shown), a current collector 344, a catholyte 346, and an optional binder (not shown). In one arrangement, the catholyte 346 includes any of the grafted polymer electrolytes disclosed herein. In another arrangement, the catholyte 346 includes mixtures or combinations of other solid polymer electrolytes with the grafted polymer electrolytes disclosed herein. There is a separator electrolyte 360 between the anode 320 and the cathode 340. The separator electrolyte 360 facilitates movement of lithium ions back and forth between the anode 320 and the cathode 340 as the cell 300 cycles. The separator electrolyte 360 may include any electrolyte that is suitable for use in a lithium battery cell. In one arrangement, the separator electrolyte 360 contains a liquid electrolyte that is soaked into a porous plastic material (not shown). In another arrangement, the separator electrolyte 360 contains a viscous liquid or gel electrolyte. In another arrangement, the separator region 360 contains a solid polymer electrolyte in which the grafted polymer electrolyte is immiscible.

Figure 4:
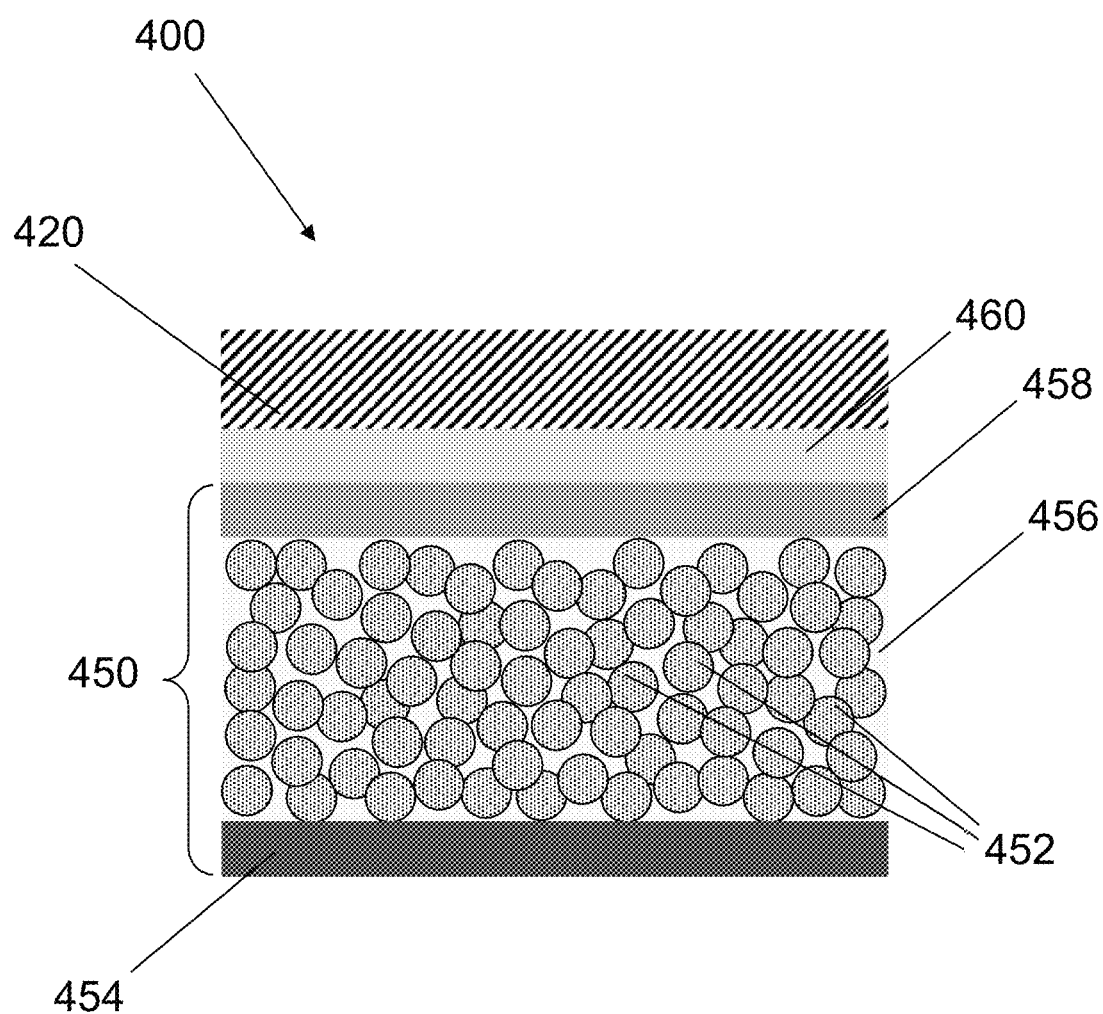
FIG. 4 is a schematic illustration of another configuration of a lithium battery cell that contains a catholyte and a cathode overcoat layer, according to an embodiment of the invention.

In another embodiment of the invention, a battery cell with a third configuration is described. With reference to FIG. 4, a lithium battery cell 400 has an anode 420 that is configured to absorb and release lithium ions. The anode 420 may be a lithium or lithium alloy foil or it may be made of a material into which lithium ions can be absorbed such as graphite or silicon. Other choices for the anode 420 include, but are not limited to, lithium titanate, and lithium-silicon alloys. The lithium battery cell 400 also has a cathode 450 that includes cathode active material particles 452, an electronically-conductive additive (not shown), a current collector 454, a catholyte 456, an optional binder (not shown), and an overcoat layer 458. In one arrangement, the electrolyte in the overcoat layer 458 and the catholyte 456 are the same. In another arrangement, the electrolyte in the overcoat layer 458 and the catholyte 456 are different. The overcoat layer 458 and/or the catholyte 456 may contain any of the grafted polymer electrolytes disclosed herein or mixtures or combinations of other solid polymer electrolytes with grafted polymer electrolytes or electrolyte additives (in a solid polymer electrolyte host) disclosed herein. In one arrangement, the overcoat layer 458 is a solid electrolyte layer. There is a separator region 460 between the anode 420 and the cathode 450. The separator region 460 contains an electrolyte that facilitates movement of lithium ions back and forth between the anode 420 and the cathode 450 as the cell 400 cycles. The separator region may include any electrolyte that is suitable for such use in a lithium battery cell. In one arrangement, the separator electrolyte 460 contains a liquid electrolyte that is soaked into a porous plastic material (not shown). In another arrangement, the separator electrolyte 460 contains a viscous liquid or gel electrolyte. In another arrangement, the separator region 460 contains a solid polymer electrolyte in which the grafted polymer electrolyte is immiscible.

A solid polymer electrolyte for use in separator region, such as separator regions 360 or 460, can be any electrolyte that is appropriate for use in a Li battery. Of course, many such electrolytes also include electrolyte salt(s) that help to provide ionic conductivity. Examples of useful Li salts include, but are not limited to, $LiPF_6$, $LiBF_4$, $LiN(CF_3SO_2)_2$, $Li(CF_3SO_2)_3C$, $LiN(SO_2CF_2CF_3)_2$, $LiB(C_2O_4)_2$, $Li_2B_{12}F_xH_{12-x}$, $Li_2B_{12}F_{12}$, LiTFSI, LiFSI, and mixtures thereof. Examples of such electrolytes include, but are not limited to, block copolymers that contain ionically-conductive blocks and structural blocks that make up ionically-conductive phases and structural phases, respectively. The ionically-conductive phase may contain one or more graft and linear polymers such as polyesters, polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. In one arrangement, the ionically-conductive phase contains one or more grafted polyesters-based polymer electrolytes, as disclosed herein. The grafted polymers can also be used in combination as linear or graft copolymers with polysiloxanes, polyalkoxysiloxanes, polyphosphazines, polyolefins, and/or polydienes to form the conductive phase. The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state.

With respect to the embodiments described in FIGS. 2, 3, and 4, suitable cathode active materials include, but are not limited to, LFP (lithium iron phosphate), LMP (lithium metal phosphate in which the metal can be Mn, Co, or Ni), $V_2O_5$ (divanadium pentoxide), NCA (lithium nickel cobalt aluminum oxide), NCM (lithium nickel cobalt manganese oxide), high energy NCM (HE-NCM—magnesium-rich lithium nickel cobalt manganese oxide), lithium manganese spinel, lithium nickel manganese spinel, and combinations thereof. Suitable electronically-conductive additives include, but are not limited to, carbon black, graphite, vapor-grown carbon fiber, graphene, carbon nanotubes, and combinations thereof. A binder can be used to hold together the cathode active material particles and the electronically conductive additive. Suitable binders include, but are not limited to, PVDF (polyvinylidene difluoride), PVDF-HFP poly (vinylidene fluoride-co-hexafluoropropylene), PAN (polyacrylonitrile), PAA (polyacrylic acid), PEO (polyethylene oxide), CMC (carboxymethyl cellulose), and SBR (styrene-butadiene rubber).

Any of the polymers described herein may be liquid or solid, depending on its molecular weight. Any of the polymers described herein may be in a crosslinked or an uncrosslinked state. Any of the polymers described herein may be crystalline or glassy. Any of the polymers described herein may be copolymerized with other polymers to form copolymers, block copolymers, or graft copolymers. Copolymerization may also affect the mechanical properties of some polymers allowing them to become solid polymer electrolytes. Any of the polymers described herein can be combined with an electrolyte salt to be used as a solid polymer electrolyte. Any of these solid polymer electrolytes may be used as separator, catholyte, anolyte, or any combination thereof in a battery cell.

EXAMPLES

The following example provides details relating to synthesis of grafted polymers in accordance with the present invention. It should be understood the following is representative only, and that the invention is not limited by the detail set forth in this example.

Poly(norbornene)-Graft-Poly(caprolactone) Synthesis

In an exemplary embodiment, poly(caprolactone) grafted onto poly(norbornene) was synthesized in two steps as follows.

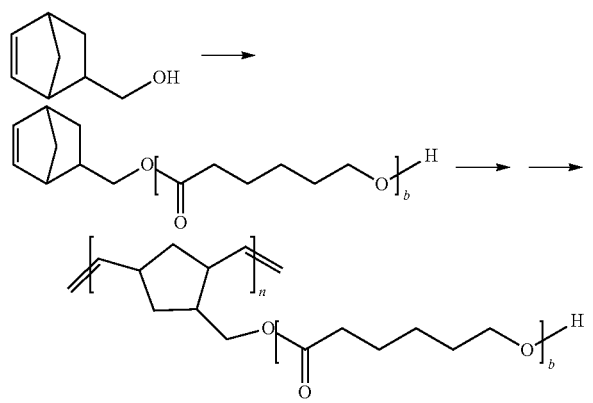

Stannus octoate (4.8 mL, 44.8 mmol) in toluene was added to a mixture of norbornene methanol (4.0 g, 34.5 mmol) and caprolactone (12.72 g, 68.9 mmol) in an argon atmosphere at room temperature, and the mixture was heated at 130° C. for 24 hours. The polymerized reaction mixture was dissolved in THF, and the polymer was precipitated out in a large amount of methanol. The precipitated polymer was filtered to remove the solvent and dried under vacuum to obtain norbornene-poly(caprolactone) (4.3 g, 58%).

To a solution of norbornene-poly(caprolactone) (3 g, 13.9 mmol) in toluene (9.6 mL) was added Grubb's first-generation catalyst (0.046 g, 0.28 mmol) and the mixture was stirred at room temperature for 4 hrs. The viscous polymerized mixture was then added dropwise into a large volume (100 mL) of stirring methanol. The precipitated solid polymer was filtered and dried in vacuo to obtain poly(norbornene)-graft-poly(caprolactone) as a colorless solid (yield 2.5 g, 83%).

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:
1. A polymer, comprising:
a grafted polymer with the following structure:

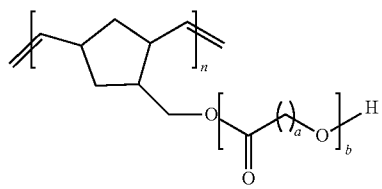

wherein:
a, b, and n are all integers; a ranges from 1-10; b ranges from 1 to 1000; and n ranges from 2 to 1000,
wherein the polymer further comprises an electrolyte salt and the polymer is an electrolyte.
2. The polymer of claim 1 further comprising ceramic electrolyte particles.
3. The polymer of claim 1 wherein the polymer is crosslinked.
4. The polymer of claim 3 further comprising an electrolyte salt, wherein the polymer is an electrolyte.
5. A positive electrode comprising:
positive electrode active material particles; and
a catholyte comprising the electrolyte according to claim 1;
wherein the positive electrode active material particles and the catholyte are mixed together.
6. The positive electrode of claim 5 wherein the catholyte further comprises a solid polymer electrolyte.
7. The positive electrode of claim 5 wherein the catholyte further comprises ceramic electrolyte particles.
8. The positive electrode of claim 5 wherein the catholyte is crosslinked.
9. The positive electrode of claim 5 wherein the positive electrode active material is selected from the group consisting of lithium iron phosphate, lithium metal phosphate, divanadium pentoxide, lithium nickel cobalt aluminum oxide, lithium nickel cobalt manganese oxide, magnesium-rich lithium nickel cobalt manganese oxide, lithium manganese spinel, lithium nickel manganese spinel, and combinations thereof.
10. The positive electrode of claim 5 further comprising an electronically-conductive additive.

11. An electrochemical cell, comprising:

an anode configured to absorb and release lithium ions;

a cathode comprising cathode active material particles, an electronically-conductive additive, and a first catholyte;

a current collector adjacent to an outside surface of the cathode; and a separator region between the anode and the cathode, the separator region comprising a separator electrolyte configured to facilitate movement of lithium ions back and forth between the anode and the cathode;

the first catholyte comprises the electrolyte according to claim 1, and the electrolyte salt is a lithium salt.

12. The electrochemical cell of claim 11 wherein the first catholyte further comprises a solid polymer electrolyte.

13. The electrochemical cell of claim 11 wherein the first catholyte and the separator electrolyte are the same.

14. The electrochemical cell of claim 11 wherein the separator electrolyte comprises a solid polymer electrolyte.

15. The electrochemical cell of claim 11 further comprising an overcoat layer between the cathode and the separator region, the overcoat layer comprising a second catholyte, the second catholyte comprising the electrolyte according to claim 2.

16. The electrochemical cell of claim 15 wherein the first catholyte and the second catholyte are the same.

17. The electrochemical cell of claim 11 wherein the anode comprises a material selected from the group consisting of lithium metal, lithium alloy, lithium titanate, graphite, and silicon.

18. The electrochemical cell of claim 11 wherein the first catholyte further comprises ceramic electrolyte particles.

19. The electrochemical cell of claim 11 wherein the first catholyte is crosslinked.

* * * * *